US008606706B2

(12) United States Patent
Zanzot et al.

(10) Patent No.: US 8,606,706 B2
(45) Date of Patent: Dec. 10, 2013

(54) SYSTEMS, METHODS AND COMPUTER PROGRAM PRODUCTS FOR STANDARDIZATION OF PAYMENT REQUESTS TO FACILITATE COMPREHENSIVE PAYMENT HUB PROCESSING

(75) Inventors: Mark D. Zanzot, Huntersville, NC (US); Garrett C. Briggs, Seattle, WA (US); Eric Dryer, Charlotte, NC (US); Anthony B. Calderone, Matthews, NC (US); William Earl Thomas, II, Charlotte, NC (US); Philip Tobin, Huntersville, NC (US); David Todd Frew, Fort Mill, SC (US); Kerry Cantley, Fort Mill, SC (US)

(73) Assignee: Bank of America Corporation, Charlotte, NC (US)

( * ) Notice: Subject to any disclaimer, the term of this patent is extended or adjusted under 35 U.S.C. 154(b) by 747 days.

(21) Appl. No.: 12/433,272

(22) Filed: Apr. 30, 2009

(65) Prior Publication Data

US 2010/0211422 A1  Aug. 19, 2010

Related U.S. Application Data

(63) Continuation-in-part of application No. 12/370,943, filed on Feb. 13, 2009.

(51) Int. Cl.
*G06Q 40/00* (2012.01)
(52) U.S. Cl.
USPC .......................................................... 705/40
(58) Field of Classification Search
USPC .......................................................... 705/40
See application file for complete search history.

(56) References Cited

U.S. PATENT DOCUMENTS

| 2002/0023053 | A1 | 2/2002 | Szoc et al. | |
| 2003/0140007 | A1* | 7/2003 | Kramer et al. | 705/40 |
| 2003/0208440 | A1* | 11/2003 | Harada et al. | 705/39 |
| 2004/0215560 | A1* | 10/2004 | Amalraj et al. | 705/40 |
| 2005/0010524 | A1 | 1/2005 | Gutbrod et al. | |
| 2006/0095364 | A1 | 5/2006 | Hamilton et al. | |

(Continued)

FOREIGN PATENT DOCUMENTS

WO    WO 2005/081917 A2    9/2005

OTHER PUBLICATIONS

European Search Report completed May 27, 2010 for European Application No. EP 10 25 0246.

(Continued)

*Primary Examiner* — Olabode Akintola
(74) *Attorney, Agent, or Firm* — Michael A. Springs; Moore & Van Allen, PLLC; James C. Edwards

(57) ABSTRACT

Systems, methods, and computer program products are provided for conducting comprehensive payment processing of all payment requests regardless of the payment request channel. Payment requests are transformed from the initial format to a standardized format, which allows for the occurrence of further comprehensive payment processing, referred to herein as payment hub processing. Once the payment request has undergone necessary payment hub processing, the request undergoes further transformation/conversion from the standardized format to a target clearing format. In one embodiment of the invention, the processing hub provides for determining the clearing or remittance channel based on payment routing rules, which may take into account cost, time, risk and any other payment factors.

38 Claims, 11 Drawing Sheets

(56) References Cited

U.S. PATENT DOCUMENTS

2007/0061260 A1  3/2007  deGroeve et al.
2007/0198437 A1  8/2007  Eisner et al.
2008/0015985 A1*  1/2008  Abhari et al. .................. 705/42
2008/0195537 A1  8/2008  Schulz
2008/0290181 A1  11/2008  Dimitri et al.

OTHER PUBLICATIONS

International Search Report and the Written Opinion of the International Searching Authority mailed Apr. 2, 2010 for International Application No. PCT/US 10/24113.

International Search Report and the Written Opinion of the International Searching Authority mailed Apr. 12, 2010 for International Application No. PCT/US 10/24113.

Extended European Search Report mailed Jun. 1, 2010 for European Application No. EP 10 25 0245.

International Preliminary Report on Patentability dated Aug. 25, 2011 for PCT/US2010/024113.

International Preliminary Report on Patentability dated Aug. 25, 2011 for PCT/US2010/024123.

Instituto Mexicano de la Propiedad Industrial. Mexico Office Action dated May 29, 2012. Mexico Application No. MX/a/2010/001718. Name of Applicant: Bank of America Corporation. Spanish Language. 3 pages.

European Patent Office. European Application No. 10 250 245.7-1955. European Office Action dated May 6, 2013. Name of Applicant: Bank of America Corporation. 7 pages.

Instituto Mexicano de la Propiedad Industrial. Mexico Office Action dated Apr. 8, 2013. Mexico Application No. MX/a/2010/001717. Name of Applicant: Bank of America Corporation. Spanish Language. 3 pages.

Instituto Mexicano de la Propiedad Industrial. Mexico Office Action dated Apr. 8, 2013. Mexico Application No. MX/a/2010/001717. Name of Applicant: Bank of America Corporation. English Language Summary. 1 page.

Instituto Mexicano de la Propiedad Industrial. Mexico Office Action dated May 29, 2012. Mexico Application No. MX/a/2010/001718. Name of Applicant: Bank of America Corporation. English Language Summary. 1 page.

* cited by examiner

SYSTEMS, METHODS AND COMPUTER PROGRAM PRODUCTS FOR STANDARDIZATION OF PAYMENT REQUESTS TO FACILITATE COMPREHENSIVE PAYMENT HUB PROCESSING

REFERENCE TO CO-PENDING APPLICATION FOR PATENT

The present application is a continuation-in-part of U.S. patent application Ser. No. 12/370,943, entitled, "Systems, Methods and Computer Program Products for Optimizing Routing of Financial Payments," filed on Feb. 13, 2009, assigned to the assignee of the present application, the contents of which are hereby incorporated by reference in their entirety.

FIELD

In general, embodiments herein disclosed relate to systems, methods, and computer program products for processing financial payments and, more specifically, standardization/transformation of all types of payment requests into a single format to facilitate comprehensive payment hub processing.

BACKGROUND

Currently, in the United States market, financial payment processing follows traditional product based routing. This means that payment is destined for a specific product silo prior to being received by a financial institution. Silo payment processing occurs prior to image capture and involves a series of linearly processed steps, in which the form of the received payment input is, in many instances, the same as the payment remittance/settlement. For example, if the payment is inputted electronically, the product silo outputs payment, in many instances, electronically. Thus, each payment type, such as paper, image, electronic, wire, Automated Clearing House (ACH) and the like, has its own product silo and the channel, and thus silo, is chosen prior to transaction submission. These individual product silos are not fully integrated and as such, operate autonomously as separate systems. In this regard, specific product silos require specific logic processing and processing hardware based on which payment type/product the silo is set-up to accommodate.

International payment systems differ somewhat in that the payments are destined for low value channels or high value channels but, similar to Unites States payment processing, payments are pre-dispositioned prior to transmission.

Neither domestic nor international payment systems account for the customer/payor and, in some instances, the payment-processing financial institution, in terms of cost efficiency, timeliness of payment or other payment factors. For example, while a customer may be unconcerned with how a payment is routed, they are typically concerned with the speed of which the payment is received by the payee. In most instances, the customer/payor will desire payment to be received by the payee as soon as possible, however, in some instances the payor may desire a lag-time in payment receipt by the payor to insure that sufficient funds exist in the designated payment account. In addition to timeliness, the customer/payor may be concerned with the quality or risk of the payment transaction, i.e., insuring that the payment is made at the designated time and destination and/or the costs incurred by the customer/payor in making the payment. From the financial institution standpoint, the financial institution is concerned with making the payment in the most cost-efficient manner, so to maximize their profitability, while taking into account the customer's needs in terms of timeliness and payment risk.

Therefore, a need exists to develop systems, method, computer program products and the like for processing financial payments more effectively and cost efficiently. The desired systems, methods, computer program products and the like should allow for processing all types of payment requests in a comprehensive payment processing system. Additionally, the desired systems, methods, computer program products and the like should allow for customers/payors to either predefine payment configuration or dynamically define payment configuration on a per-payment or per-payment file basis, so as to address the needs of the customer/payor in terms of payment timeliness, payment cost, payment quality and the like. In addition, desired systems, methods, computer program products and the like should allow for financial institution to make payment routing decisions that not only take into account the customer's/payor's needs and concerns, but also take into account the financial institutions concern of minimizing the costs related to each transaction. Moreover, by providing for methods, computer program products and the like that allow the customer/payor greater options in predetermined payment configuration and/or dynamically configuring payment on a per-payment basis, the financial institution can implement different price points in the payment process.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Methods, devices, systems and computer program products are described herein that provide for conducting comprehensive payment processing of all payment requests regardless of the payment request channel. Embodiments herein disclosed provide for transforming, or otherwise converting the initial format of the payment request to a standardized format, which allows for the occurrence of further comprehensive payment processing, referred to herein as payment hub processing. Once the payment request has undergone necessary payment hub processing, the request undergoes further transformation/conversion from the standardized format to a target clearing format. In one embodiment of the invention, the processing hub provides for determining the clearing or remittance channel based on payment routing rules, which may take into account cost, time, risk and any other payment factors. Thus, the type of payment input channel may differ from the type of payment output channel and the standardization of the payment request format allows for such to incur.

According to one embodiment of the invention, a method for processing financial payments is defined. The method includes receiving a plurality of financial payment requests originating from a plurality of different payment channels. Each payment channel being associated with a respective initial format. The method further includes transforming the initial format of the plurality of financial payment requests into a standardized format irrespective of the payment channel and processing the plurality of financial payment requests in the standardized format. Additionally, the method includes transforming the processed payment requests to a designated clearing format and providing for financial payment for each of the payment requests.

According to one specific embodiment of the method, transforming the initial format may further include transforming the initial format of the plurality of financial payment requests into an International Organization for Standardization (ISO) 200022, universal financial industry message scheme format.

In other embodiments of the method, processing the plurality of financial payment requests may further include determining payment routing for the payment request based on one or more routing rules, wherein payment routing defines a payment type. The one or more routing rules may be associated with at least one of payment processing time, payment processing cost, payment processing risk, remittance requirements or payment destination. In one specific embodiment, the one or more routing rules are operable to determine a least-cost payment type that meets time requirements and risk requirements. In such embodiments, transforming the processed payment requests to a designated clearing format may further include transforming the processed payment requests to a designated clearing format determined based on the payment routing. Additionally, providing for financial payment for each of the payment requests may further include providing for financial payment for each of the payment requests via the defined payment type.

In still further embodiments of the method, processing the plurality of financial payment requests may further include one or more of managing initiation of future dated and recurring payments, correlating credits and debits, validating the payment and associated payment account attributes, processing one or more bulk financial payment requests, storing at least one of future dated payments, payment history or recurring payments, ensuring payment compliance to one or more of a regulatory requirement, an anti-money laundering requirement or an Office of Foreign Assets Control (OFAC) requirement, providing foreign exchange processing based on currency type, providing a financial risk assessment, and/or providing financial payment exception handling processing.

In another specific embodiment of the method, receiving a plurality of financial payment requests may further include receiving the plurality of financial payment requests originating from the plurality of different consumer and/or business channels. The consumer channels may include, but are not limited to, Open Financial Exchange (OFX)/mobile, Personal Financial Management (PFM), Interactive Voice Response (IVR), Automated Teller Machine (ATM) and banking center. The business channels may include, but are not limited to, point of sale, image exchange, remote deposit and bulk-file messaging.

An apparatus for processing financial payments provides for another embodiment of the invention. The apparatus includes a computing platform including at least one processor and a memory. The apparatus further includes a transformation module stored in the memory, executable by the processor and operable to receive a plurality of financial payment requests originating from a plurality of different payment channels and transform each of the payment requests from an initial format associated with a payment channel to a standardized format. The transformation module is further operable to transform the processed payment requests to a designating clearing format prior to providing payment for each of the payment requests. The apparatus also includes a payment processing module stored in the memory, executable by the processor and operable to process the plurality of financial payment requests in the standardized format.

In one embodiment of the apparatus, the transformation module is further operable to transform each of the payment requests from the initial format to an International Organization for Standardization (ISO) 200022, universal financial industry message scheme format.

In other embodiments of the apparatus, the payment processing module may include a payment routine sub-module operable to determine payment routing for each of the payment requests based on one or more routing rules, wherein payment routing defines a payment type. The one or more routing rules may be associated with at least one of payment processing time, payment processing cost, payment processing risk, remittance requirements or payment destination. In one specific embodiment, the one or more routing rules may be operable to determine a least-cost payment type that meets time requirements and risk requirements. In such embodiments, the transformation module may be further operable to transform the processed payment requests to a designated clearing format determined based on the payment routing.

In further embodiments of the apparatus, the payment processing module may include one or more, and in one specific embodiment all, sub-modules, including a payment routing sub-module, a future payment management sub-module, a debit and credit sub-module, a validation sub-module, a bulk payment sub-module, a payment database, a compliance sub-module, a foreign exchange sub-module, a financial risk assessment sub-module, and/or an exception handling sub-module.

In another embodiment of the apparatus, the transformation module may be further operable to receive the plurality of financial payment requests originating from the plurality of different consumer and/or business channels. The consumer channels may include, but are not limited to, Open Financial Exchange (OFX), Personal Financial Management (PFM), Interactive Voice Response (IVR), Automated Teller Machine (ATM) and banking center. The business channels may include, but are not limited to, point of sale, image exchange, remote deposit and bulk-file messaging.

In another embodiment of the apparatus, the transformation module is further operable provide for financial payment based on a determined payment type. The payment type may include but is not limited to, check payment, Automated Clearing House (ACH) payment, wire payment, card payment, merchant payment, account transfer payment, an Society for Worldwide International Financial Telecommunication (SWIFT) payment.

A computer program product including a computer-readable medium defines yet another embodiment. The medium includes a first set of codes for causing a computer to receive a plurality of financial payment requests originating from a plurality of different payment channels. Each payment channel being associated with a respective initial format. The medium additionally includes a second set of codes for causing a computer to transform the initial format of the plurality of financial payment requests into a standardized format irrespective of the payment channel and a third set of codes for causing a computer to process the plurality of financial payment requests in the standardized format. The medium also includes a fourth set of codes for causing a computer to transform the processed payment requests to a designated clearing format and a fifth set of codes and a fifth set of codes for causing a computer to provide for financial payment for each of the payment requests.

In one embodiment of the computer program product, the second set of codes is further operable to transform the initial format of the plurality of financial payment requests into an International Organization for Standardization (ISO) 200022, universal financial industry message scheme.

In other embodiments of the computer program product, the third set of codes may be further operable to cause the computer to determine payment routing for the payment request based on one or more routing rules, wherein payment routing defines a payment type. The one or more routing rules may be associated with at least one of payment processing time, payment processing cost, payment processing risk, remittance requirements or payment destination. In one specific embodiment, the one or more routing rules are operable to determine a least-cost payment type that meets time requirements and risk requirements. In such embodiments, the fourth set of codes may be further operable to cause the computer to transform the processed payment requests to a designated clearing format determined based on the payment routing and the fifth set of codes is further operable to cause the computer to provide for financial payment for each of the payment requests via the defined payment type.

In still further embodiments of the computer program product, the third set of codes may be operable to cause the computer to perform one or more of determine payment routing, manage initiation of future dated and recurring payments, correlate credits and debits, validate the payment and associated payment account attributes, process one or bulk financial payment requests, store at least one of future dated payments, payment history or recurring payments, ensure payment compliance, provide foreign exchange processing, provide a financial risk assessment and/or provide financial payment exception handling processing.

In yet other embodiments of the computer program product, the first set of codes may be further operable to cause the computer to receive the plurality of financial payment requests originating from the plurality of different consumer and/or business payment channels. The consumer channels may include, but are not limited to, Open Financial Exchange (OFX), Personal Financial Management (PFM), Interactive Voice Response (IVR), Automated Teller Machine (ATM) and banking center. The business channels may include, but are not limited to, point of sale, image exchange, remote deposit and bulk-file messaging.

Thus, present embodiments herein disclosed provide for standardizing the format of payment requests irrespective of the type of payment input channel, so as to provide for a comprehensive payment processing system that is able to process various different payment requests having different input channels. In addition, once processed, the standardized format is transformed to a target clearing format to allow for payment in a determined payment/remittance channel that may be different from the input channel. As such, the present invention, eliminates the need to have separate payment systems for each individual payment request type and provides for dynamic determination of target clearing on a per payment request basis.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
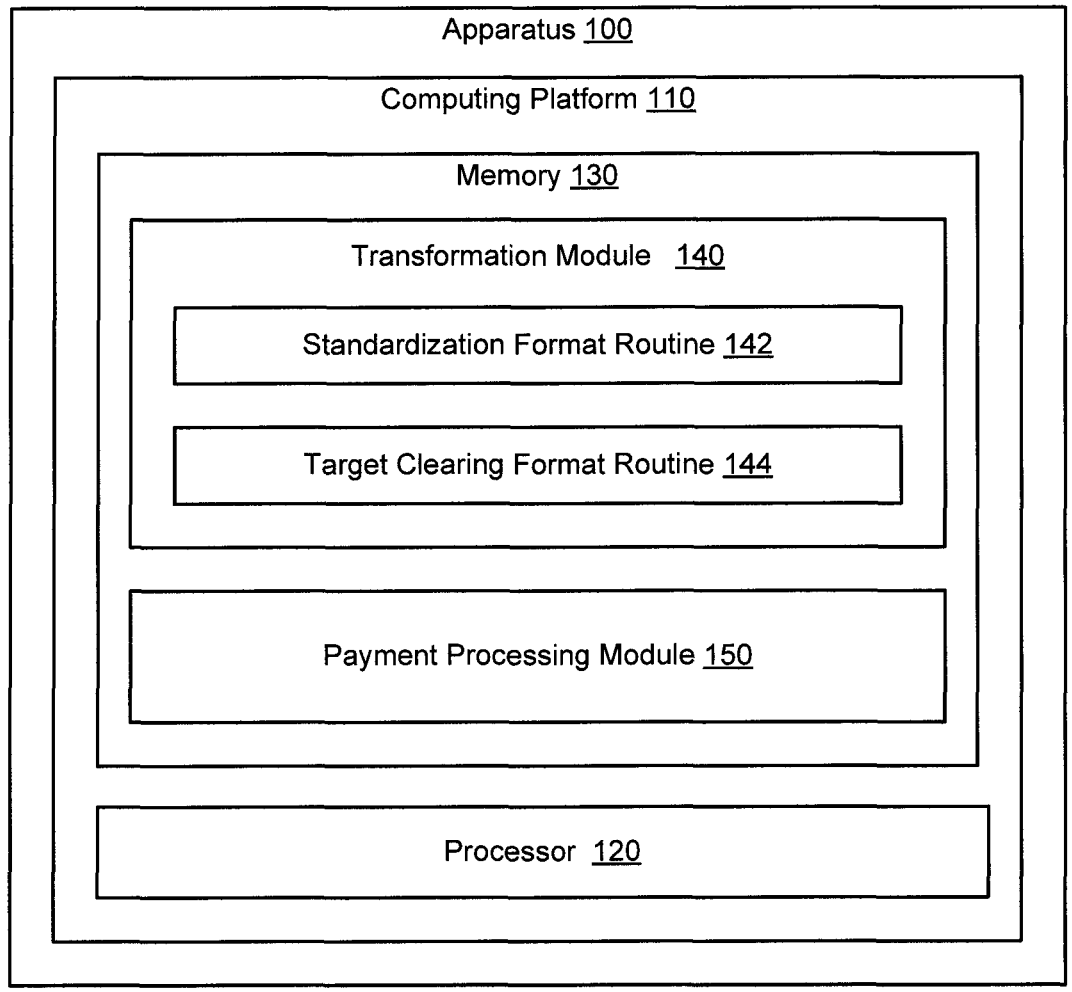
Figure 2:
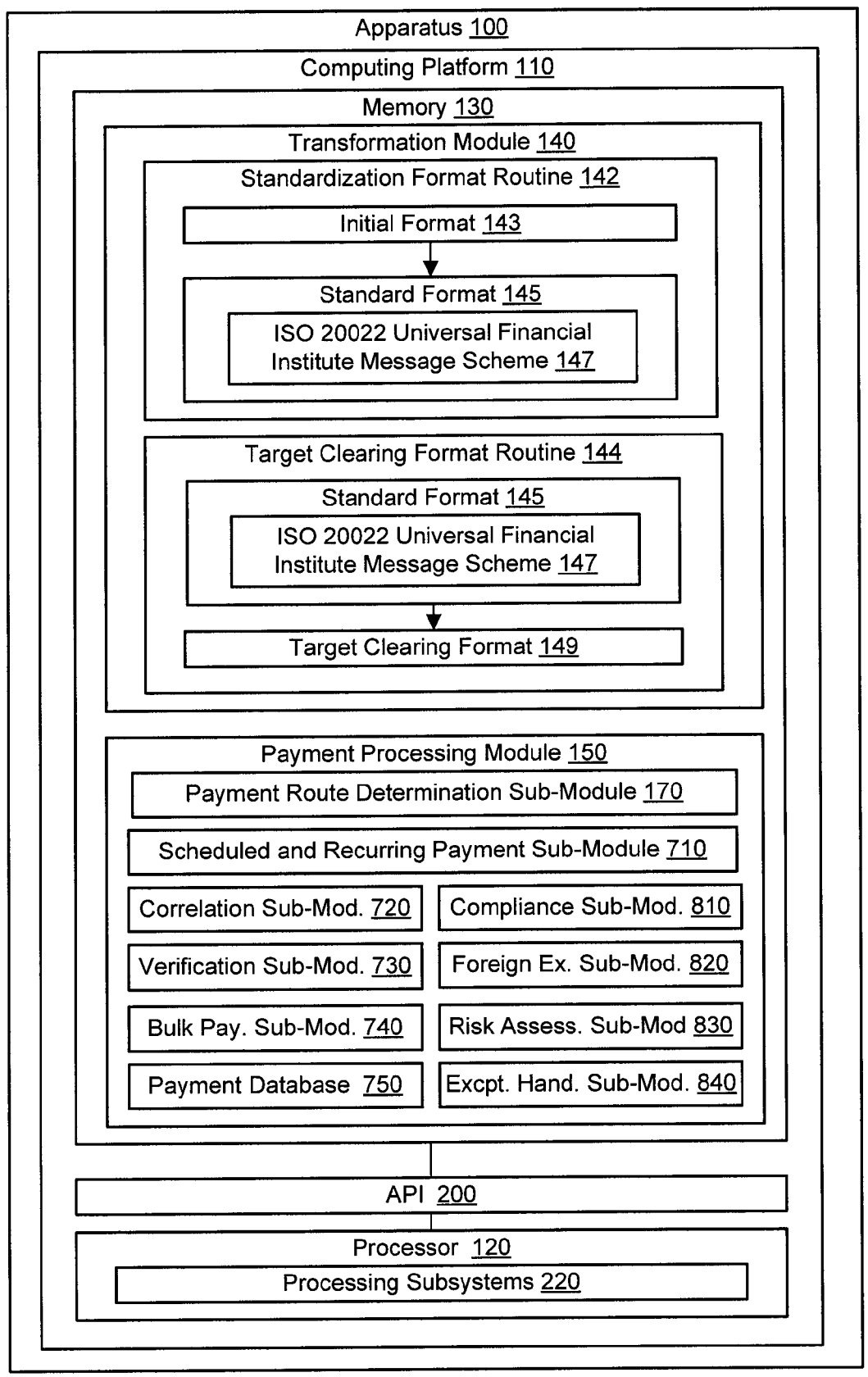

Having thus described embodiments of the invention in general terms, reference will now be made to the accompanying drawings, which are not necessarily drawn to scale, and wherein:

FIG. 1 is a block diagram of an apparatus configured to provide standardization of payments requests and payment hub processing, in accordance with one embodiment of the present invention;

FIG. 2 is a more detailed block diagram of an apparatus configured to provide payment request transformation and processing, in accordance with an embodiment of the present invention.

Figure 3:
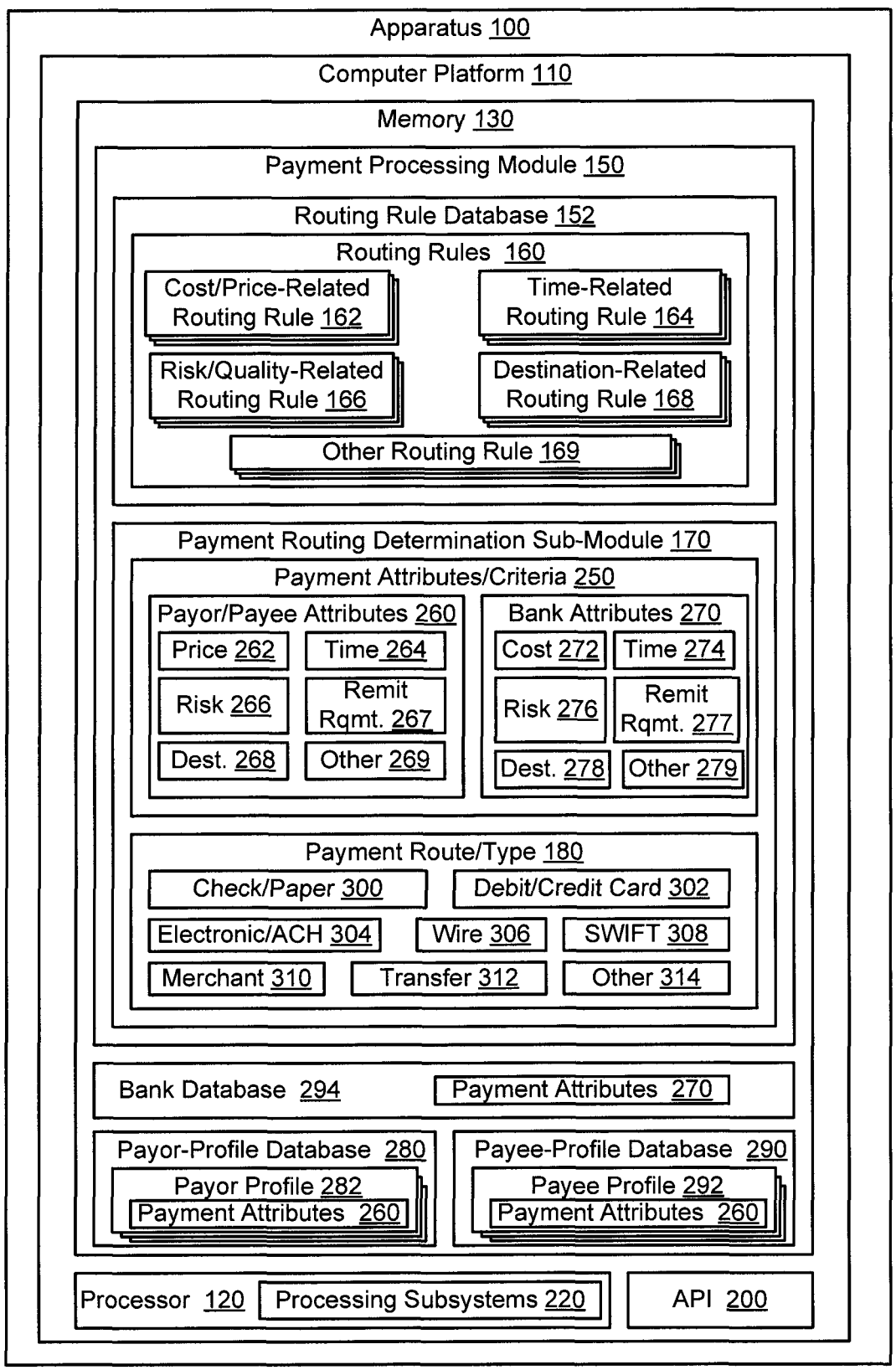
Figure 4:
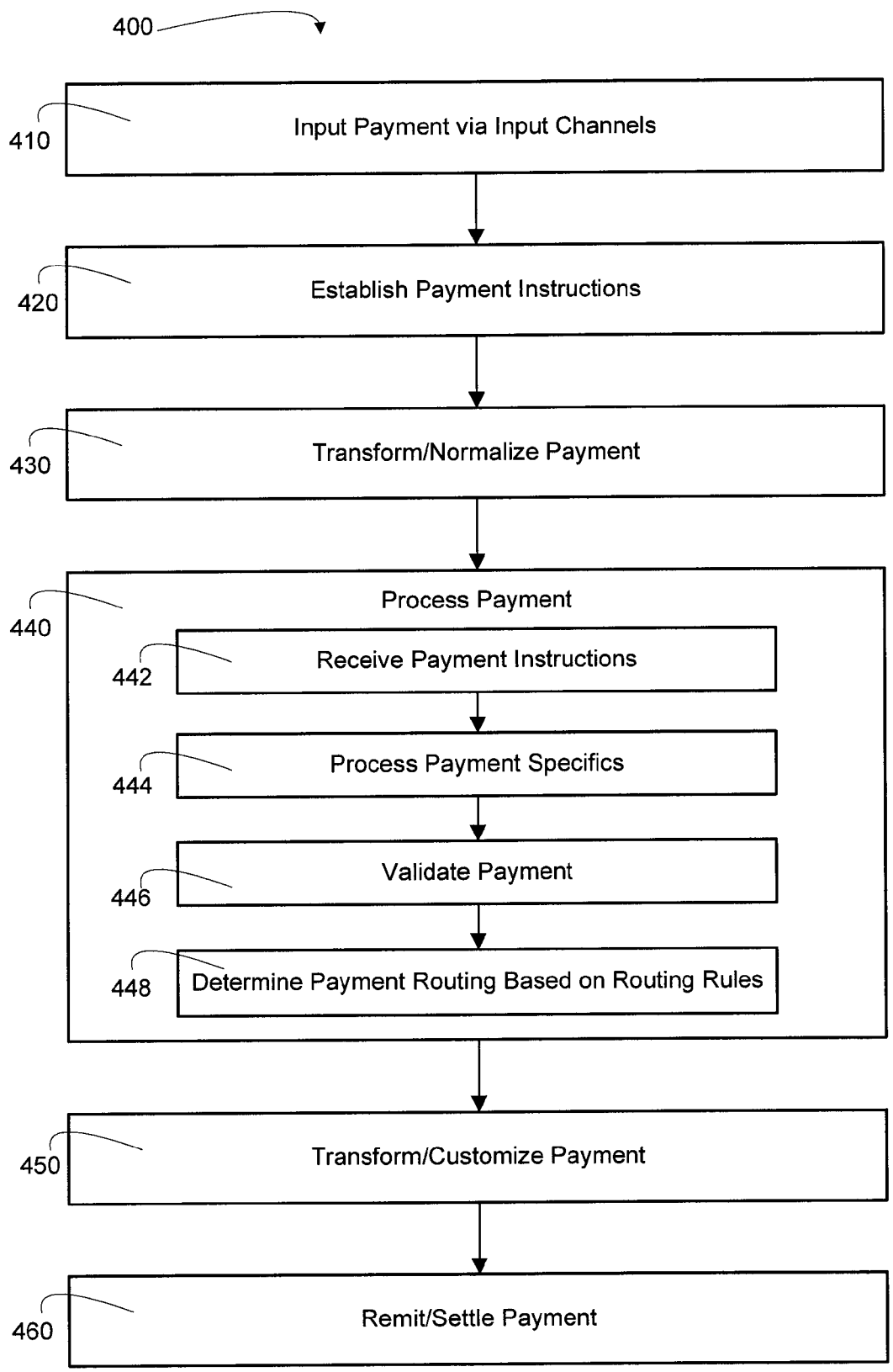
Figure 5:
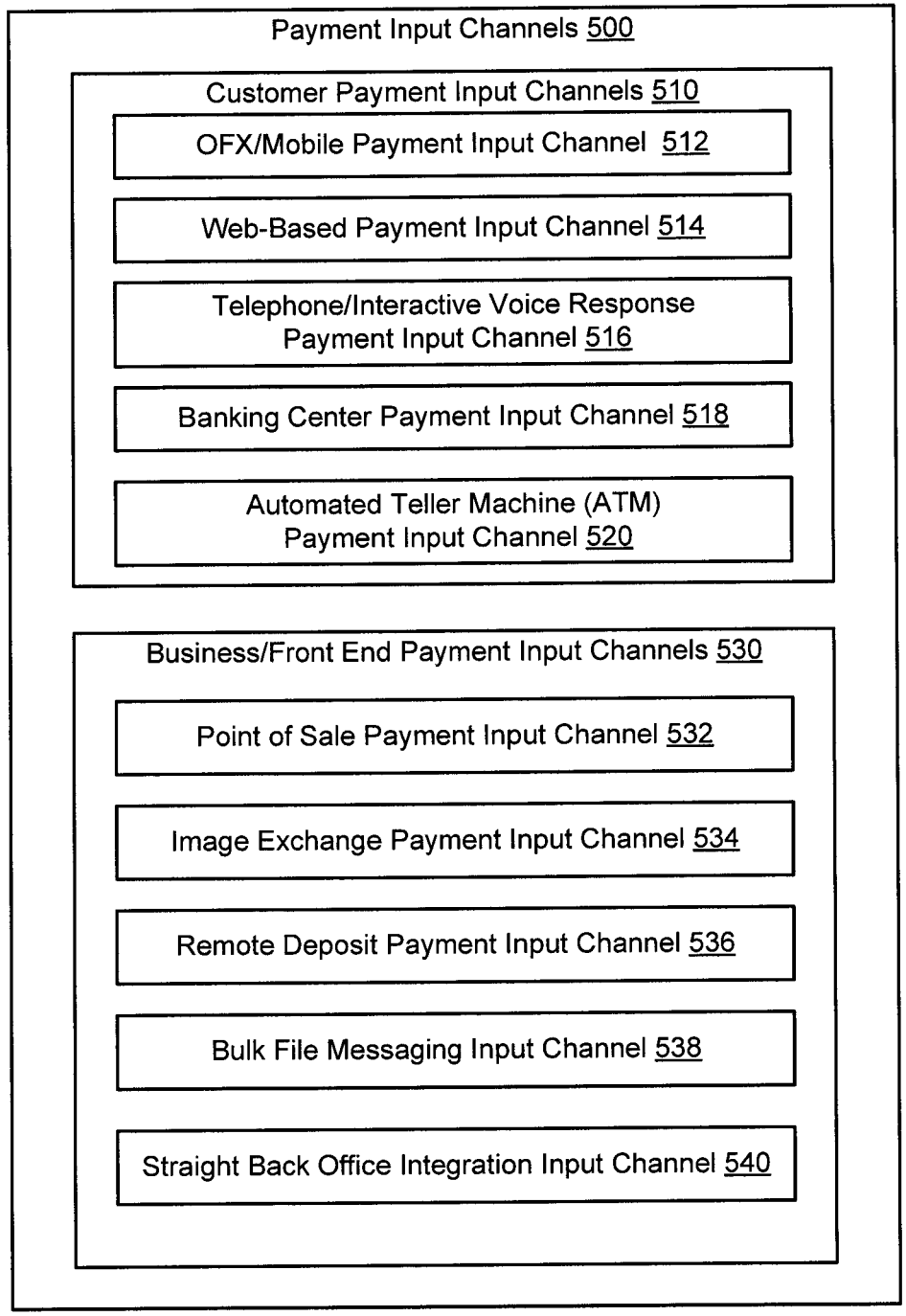
Figure 6:
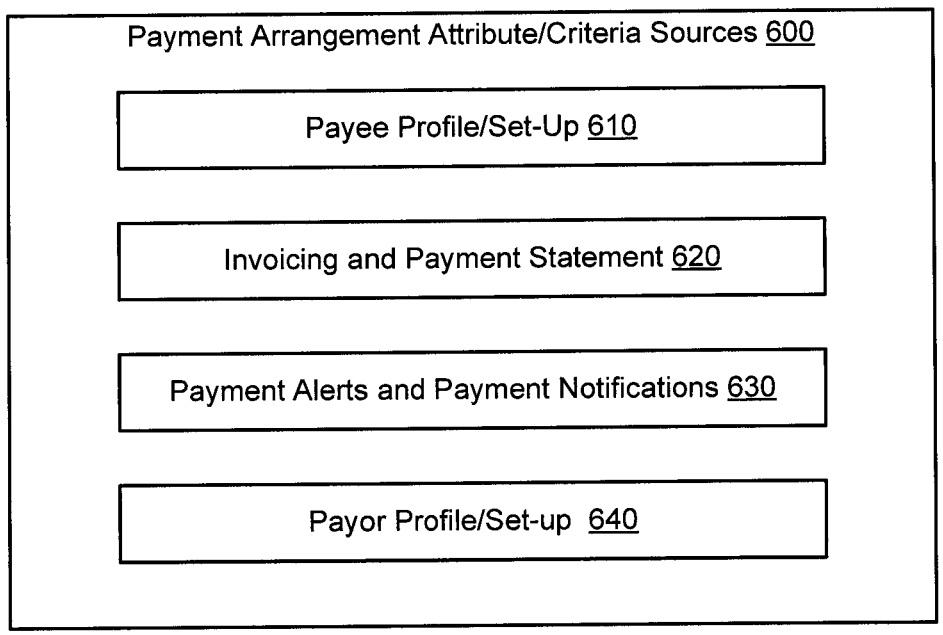
Figure 7:
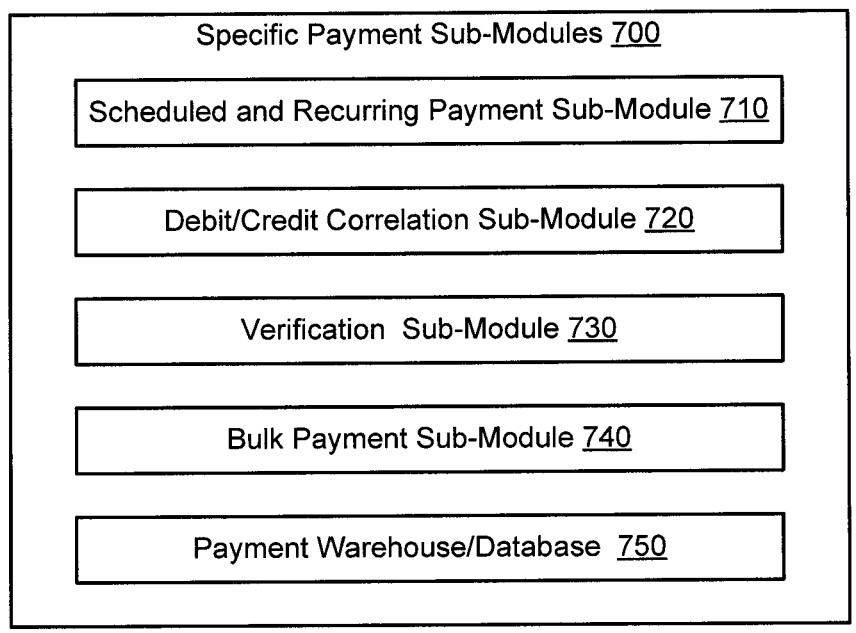
Figure 8:
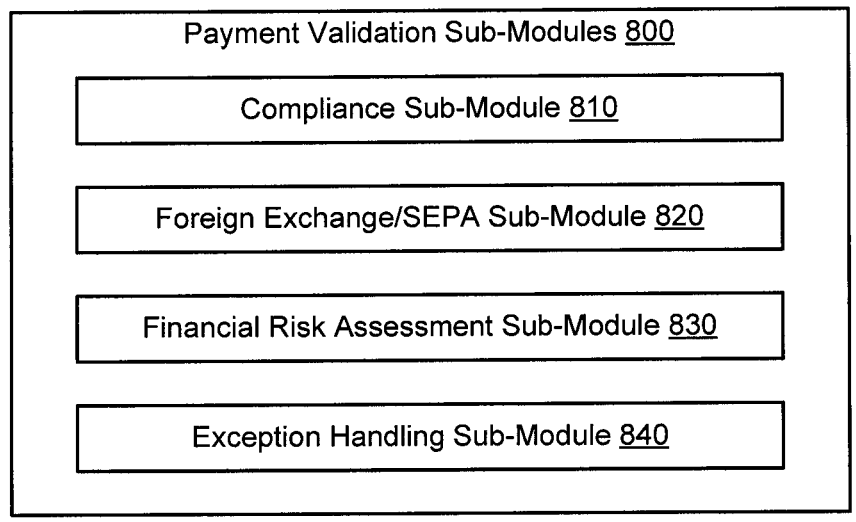
Figure 9:
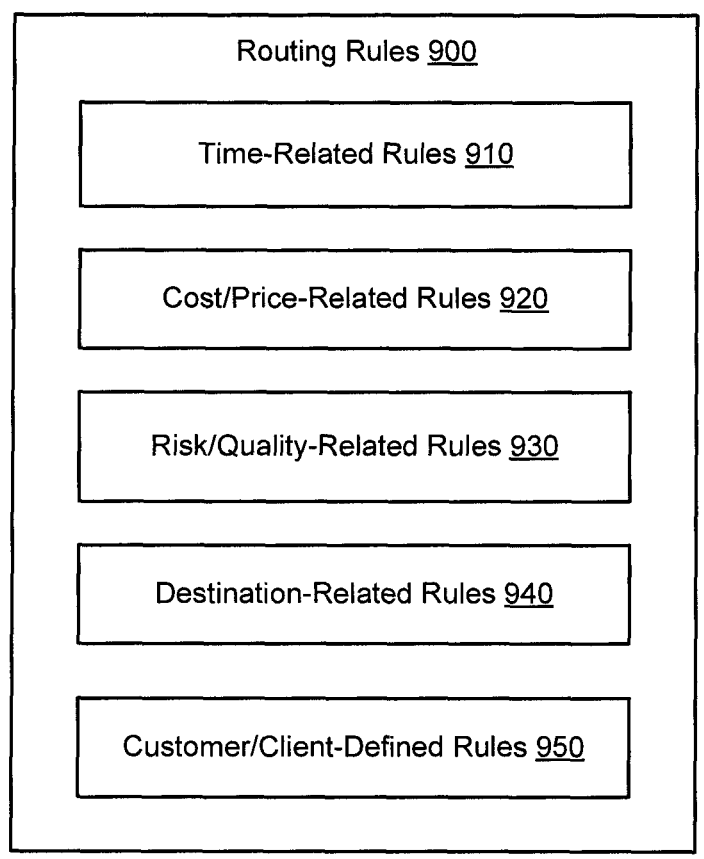
Figure 10:
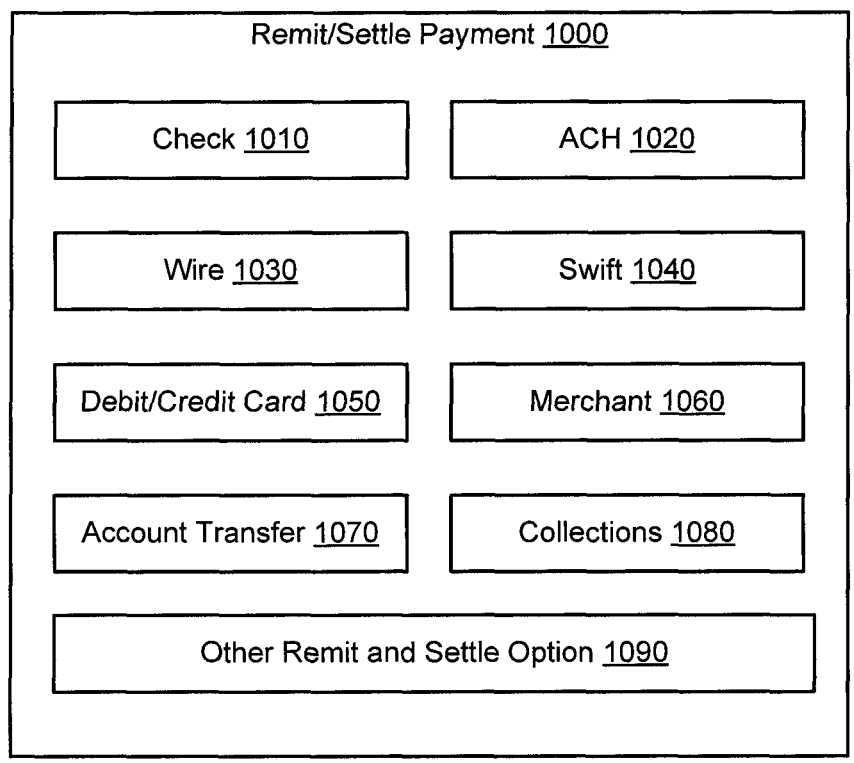
Figure 11:
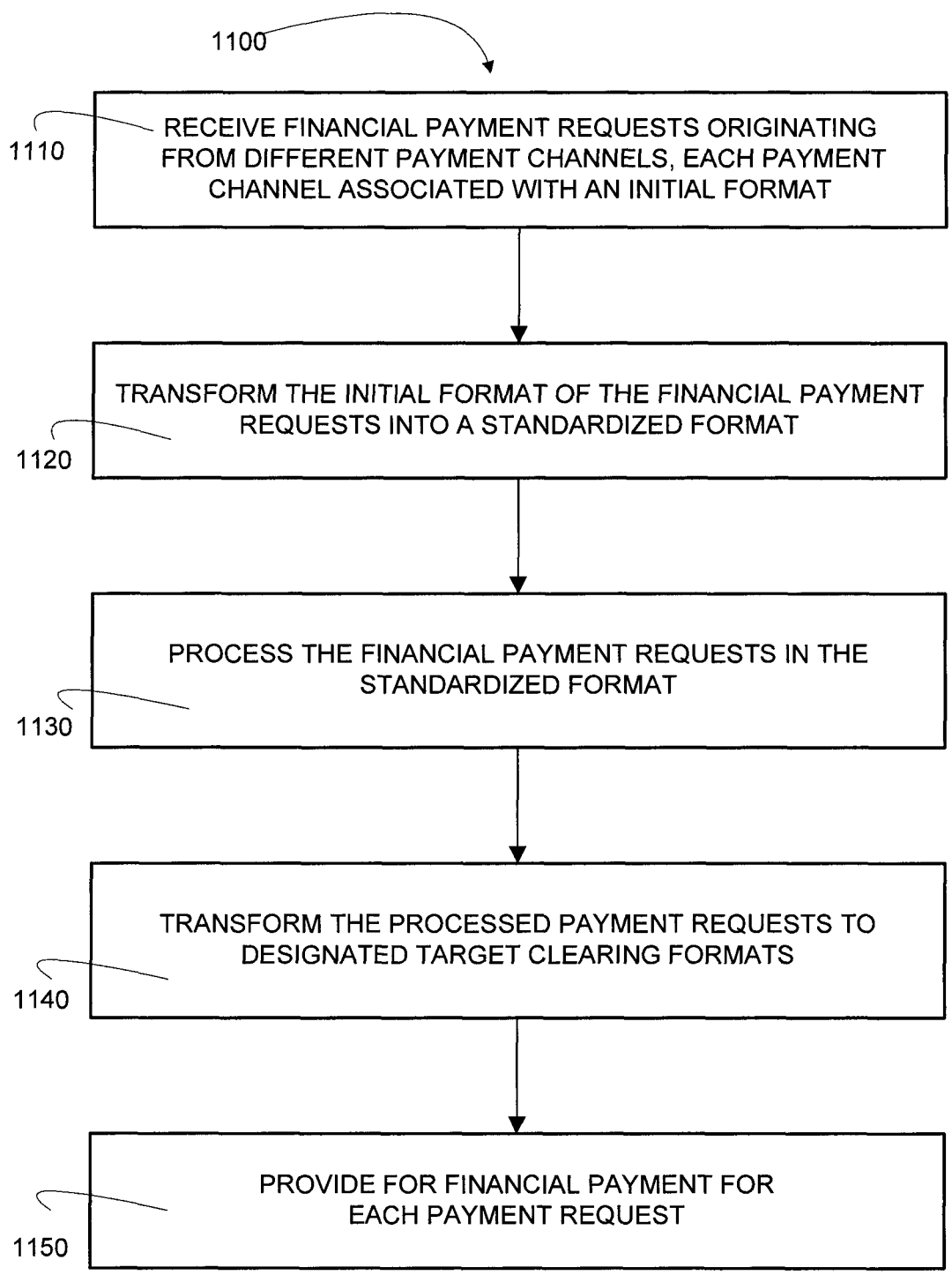

FIG. 3 is a more detailed block diagram of the apparatus configured to provide rules-based routing of financial payments, in accordance with one embodiment of the present invention;

FIG. 4 is flow diagram of a method for processing financial payment requests, in accordance with an embodiment of the present invention;

FIG. 5 is a block diagram of financial payment input channels; in accordance with an embodiment of the present invention;

FIG. 6 is a block diagram of payment arrangement attribute/criteria sources, in accordance with another embodiment of the present invention;

FIG. 7 is a block diagram of specific payment processes, including optional processes, in accordance with an embodiment of the present invention;

FIG. 8 is a block diagram of payment validation processes, in accordance with an embodiment of the present invention;

FIG. 9 is a block diagram of examples of routing rules, in accordance with an embodiment of the present invention;

FIG. 10 is a block diagram of remittance and settlement channels, in accordance with another embodiment of the present invention; and FIG. 11 is a block diagram of a flow diagram of a method for processing financial payments by determining payment routing on a per-payment request basis, according to a yet another embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems or apparatus that may include a number of devices, components, modules, and the like. It is to be understood and appreciated that the various systems or apparatus may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Thus, methods, devices, systems and computer program products are described herein that provide for conducting comprehensive payment processing of all payment requests regardless of the payment request channel. Embodiments herein disclosed provide for transforming, otherwise referred to herein as converting, normalizing or standardizing, the initial format of the payment request to a standardized format, which allows for the occurrence of further comprehensive payment processing, referred to herein as payment hub processing. Once the payment request has undergone necessary payment hub processing, the request undergoes further transformation/conversion from the standardized format to a target clearing format. In one embodiment of the invention, the processing hub provides for determining the clearing or remittance channel based on payment routing rules, which may take into account cost, time, risk and any other payment factors.

Referring to FIG. 1 a block diagram is depicted of an apparatus 100 configured to provide financial payment processing, according to embodiments of the present invention. As previously noted apparatus 100 may include one or multiple devices. In multiple device embodiments, the devices may be in networked communication with one another. Apparatus 100 includes a computing platform 110 having at least one processor 120 and a memory 130.

Memory 130 of apparatus 100 includes a transformation module 140 that includes a standardization format routine 142 that is operable to receive financial payment requests originating from different payment input channels and transform each of the payment requests from an initial format associated with the payment input channel to a standardized format. In one embodiment of the invention the standardized format conforms to International Organization for Standardization (ISO) 200022, Universal Financial Industry Message Scheme format. In addition, the transformation module 140 includes target clearing format routine 144 that is operable to transform the standardized format to a target clearing/remittance format once the payment request has been processed in the standardized format.

The memory 130 of apparatus 100 additionally includes a payment processing module 150, otherwise referred to herein as a payment hub module, that is operable to perform comprehensive payment process on the standardize formatted payment request and clear the requests for remittance and settlement. It should be noted that while FIG. 1 depicts a single module, in accordance with present embodiments, payment processing module 150 may comprise multiple modules and/or sub-modules and the multiple modules/sub-modules may be included within various different apparatus. Thus, the routines, applications, databases and logic described in relation to payment processing module 150 may be included within multiple distinct modules.

FIG. 2 provides a more detailed depiction of the apparatus 100, according to further embodiments of the present invention. In addition to providing greater detail, FIG. 2 highlights various optional embodiments. The apparatus 100 may include any type and/or combination of one or more computing devices, such as a personal computer, a laptop/portable computer, a wireless or handheld computing device, a server or the like. The computing platform 110 is operable to receive and execute modules, routines and applications, such as transformation module 140 and payment processing module 150 and the like. Computing platform 110 includes memory 130, which may comprise volatile and nonvolatile memory such as read-only and/or random-access memory (RAM and ROM), EPROM, EEPROM, flash cards, or any memory common to computing platforms. Further, memory 130 may include one or more flash memory cells, or may be any secondary or tertiary storage device, such as magnetic media, optical media, tape, or soft or hard disk.

Further, computing platform 110 also includes processor 120, which may be an application-specific integrated circuit ("ASIC"), or other chipset, processor, logic circuit, or other data processing device. Processor 120 or other processor such as ASIC may execute an application programming interface ("API") layer 200 that interfaces with any resident programs, such as payment processing module 150 and transformation module 140 or the like, stored in the memory 130 of apparatus 100.

Processor 120 includes various processing subsystems 220 embodied in hardware, firmware, software, and combinations thereof, that enable the functionality of apparatus 100 and the operability of the apparatus on a network. For example, processing subsystems 220 allow for initiating and maintaining communications, and exchanging data, with other networked devices.

The memory 130 of apparatus 130 includes transformation module 140 that is in communication with processor 120 and is operable to transform/normalize the payment requests and subsequently transform the processed payment requests to the format of the determined payment route/type. Transformation of payment types allows for the payment processing module 150 to process all types of payment requests in a payment warehouse-type environment using similar processing and techniques.

Thus, transformation module 140 includes standardization format routine 142 executable by processor 120 and operable to transform/normalize all inbound payment requests in an initial format 143 to a standard format 145, for example, in one embodiment, the standard format is in accordance with International Organization for Standardization (ISO) 20022 Universal Financial Industry Message Scheme 147 or the like.

ISO 20022 provides a financial repository that allows registered users to access. The repository includes a data dictionary that includes business concepts, message concepts and data types. The repository also includes a business process catalog that includes financial business process models, financial business transactions/messages and XML message schemas. The ISO 20022 message schemes provides for payments, such as credit transfers, direct debits, checks and the like to be made between financial institutions, clearing houses, payment factories, central banks, private and corporate customers and the like. The ISO 20022 message schemes provide a standardization that allows for payment initiation processing, cash management processing between multiple entities, and clearing and settlement processing.

Transformation module 140 additionally includes target clearing format routine 144 executable by processor 120 and operable to transform the post-payment processed, standardized format 145 to target clearing format 149 (i.e., the format of the determined payment route/settlement type).

Similar to FIG. 1, single modules are depicted for transformation module 140 and payment processing module 150, however, in accordance with present embodiments, the modules may comprise multiple modules and the multiple modules may be included within various different apparatus. Thus, the routines, applications, databases and logic described in relation payment transformation module 140 and payment processing module 150 may be included within multiple modules. Likewise, the rules and logic discussed in relation to transformation module 140 and payment processing module 150 may be included or implemented in multiple applications or routines.

Payment processing module 140 may include various sub-modules for configured for processing payment requests including but not limited to, payment route determination sub-module 170, scheduled and recurring payment sub-module 710, correlation sub-module 720, verification sub-module 730, bulk payment sub-module 740, compliance sub-module 810, foreign exchange sub-module 820, risk assessment sub-module 830 and exception handling sub-module 840. In addition the payment processing module 150 may include a payment database 750 operable to store payment history, scheduled payments, recurring payments, payee and/or payor payment attributes, financial institution payment attributes and the like.

The payment route determination sub-module 170 discussed in relation to FIG. 4. The scheduled and recurring payment sub-module 710 manages the initiation of future dated and recurring payments, including the use of predefined custom templates set-up for the scheduled/recurring payments. Debit/credit correlation sub-module 720 includes timing and sequencing processing to insure the relationship of the original payment association. In this regard, individual credits are associated and balanced to original debit when processed at a payment item level.

Verification sub-module 730 is operable to verify the payment and associated account attributes to insure positive clearing of the payment. Bulk payment sub-module 740 that is operable to aggregate and optimize communications to external systems for large payment files having multiple individual payment items with multiple payment items having the same posting accounts.

Compliance process sub-module 810 is operable to insure anti-money laundering of the payment. Compliance processing may include a security check of Office of Foreign Asset Control (OFAC) listing of known individuals, corporations or the like associated with illegal payment processing. Foreign exchange/Single European Payments Area (SEPA) sub-module 820 is operable to maximize foreign currency exchange rates, provide for multi-currency support and insure compliance with SEPA rules and regulations.

Financial risk assessment sub-module 830 is operable to provide credit and risk management for the overall payment process. In this regard, the financial risk assessment process may provide for liability risk assessment scores and the like that are subsequently used by the rules-based routing determination to limit or mandate the type of remittance/settlement route that may be implemented. For example, if the financial risk is determined to be high, route determination may exclude wire payments as a remittance/settlement payment option.

Exception handling sub-module 840 is operable to provide centralized exception processing and management of all payment types. Exception processing takes into account errors in the payment processing, such as formatting error or the like and may implement an auto repair for common exceptions/errors. Auto repair of exceptions provides for less need for manual intervention and improves straight-through payment processing rates.

FIG. 3 provides a more detailed depiction of the apparatus 100, according to further optional embodiments of the present invention. The apparatus 100 may include any type and/or combination of one or more computing devices, such as a personal computer, a laptop/portable computer, a wireless or handheld computing device, a server or the like. The computing platform 110 is operable to receive and execute modules, routines and applications, such as payment processing module 150 and the like. Computing platform 110 includes memory 130, which may comprise volatile and nonvolatile memory such as read-only and/or random-access memory (RAM and ROM), EPROM, EEPROM, flash cards, or any memory common to computing platforms. Further, memory 130 may include one or more flash memory cells, or may be any secondary or tertiary storage device, such as magnetic media, optical media, tape, or soft or hard disk.

Further, computing platform 110 also includes processor 120, which may be an application-specific integrated circuit ("ASIC"), or other chipset, processor, logic circuit, or other data processing device. Processor 120 or other processor such as ASIC may execute an application programming interface ("API") layer 200 that interfaces with any resident programs, such as payment processing module 150 or the like, stored in the memory 130 of apparatus 100.

Processor 120 includes various processing subsystems 220 embodied in hardware, firmware, software, and combinations thereof, that enable the functionality of apparatus 100 and the operability of the apparatus on a network. For example, processing subsystems 220 allow for initiating and maintaining communications, and exchanging data, with other networked devices.

Payment processing module 150 includes routing rule database 152 routing rules database 152 that includes one or more routing rules 160. The routing rules 160 may be related to payment routing factors such as, but not limited to, price/cost of processing payment, time requirements for processing the payment, the quality/risk requirements or allowances for processing the payment (i.e., the guarantee of remittance and settlement, the ability to stop payment and the like), the destination of the payment and the like. Thus, the routing rules 160 may include one or more cost/price-related routing rules 162, one or more time-related routing rules 164, one or more risk/quality-related routing rules 166, one or more destination-related routing rules 168 or other routing rules 169.

Cost/price-related routing rules 162 may define which remittance/settlement type 180 is chosen based on the price that the payor and/or payee is willing to bear for the payment being made or the cost that the financial institution is willing to bear or likely to charge the payor for handling the payment. In this regard, different remittance settlement types may be associated with different payment prices, such that, payment by one remittance/settlement type may be higher or lower in terms payment price than another remittance/settlement type.

Time-related routing rules 164 may define which remittance/settlement type 180 is chosen based on the payor's, payee's and/or the financial institution's acceptable time for completing the payment transaction. In most instances, the payor and/or payee has a desire to complete the payment as timely as possible, while the financial institution handling the payment has a desire to delay the remittance/settlement for as long a time period as possible. However, it should be noted that while in most instances the payor is concerned with making the payment as timely as possible in other instances the payor may desire to delay the time for payment, for example, if insufficient funds currently exist in the account from which the payment is being made.

Risk/Quality-related routing rules 166 may define which remittance/settlement type 180 is chosen based on the ability to insure or guarantee that the payment will be made, in other words, the service level afforded to the payment or the number of failure opportunities associated with different payment remittance/settlement types. Other risk/quality routing rules 166 may define the ability to return or stop payment during the payment process, data reconciliation capabilities, such as how funds are balanced, or any other routing rule associated with a quality or risk attribute as defined by the payor, the payee and/or the financial institution handling the payment process.

Destination-related routing rules 168 may define which remittance/settlement type 180 is chosen based the destination of the payment. For example, domestic payment may dictate certain types of remittance/settlement, while international payment may dictate other types of remittance/settlement.

Other routing rules 169 may additionally define other criteria for choosing the remittance/settlement type 180. Other routing rules may be dictated by the needs of the financial institution handling the payment process, the payor and/or the payee.

Payment module 140 additionally includes payment routing determination sub-module 170 that is executable by the processor 120 and is operable to determine payment routing (i.e., a payment type 180, otherwise referred to herein as a payment route) for a payment transaction from amongst more than one alternative payment types based on application of one or more of the routing rules. In instances in which more than one routing rule is applied to determine the remittance settlement type 180, the payment routing determination sub-module 170 may be operable to determine priority of the routing rules and/or make the appropriate routing determination that insures that the payor/payee and/or financial institution handling the payment process needs are met.

The payment routing determination sub-module 170 is operable to apply one or more payment attributes/payment criteria 250 to the one or more routing rules 160 to determine the payment route/type 180. The payment attributes may be payor-defined/payee-defined payment attributes 260 and/or financial institution/bank-defined payment attributes 270. The payor-defined/payee-defined payment attributes 260 may include, but are not limited to, price 262, time 264, risk/quality 266, remittance requirements, 267, destination 268 or any other appropriate attribute 269 that may be applied to a routing rule. The financial institution/bank-defined payment attributes 270 may include, but are not limited to, cost 272, time 274, risk/quality 276, remittance requirements 277, destination 278 or any other appropriate attribute 279 that may be applied to a routing rule.

The payment attributes/criteria 250 may be dynamically defined at the time of the payment request by the payor, the payee or the financial institution or the payment attributes/criteria 250 may be predefined attributes associated with the payor, the payee and/or financial institution. Additionally, in certain embodiments, payment attributes/criteria may be defined dynamically be the payor, payee and/or financial institution during the payment process. Thus, memory 130 may include, or the payment module may be in communication with another auxiliary device's memory (not shown in FIG. 3) that includes, payor-profile database 280, payee-profile database 290 and/or financial institution/bank database 294 operable for storing payment attributes/criteria. Thus, payor-profile database 280 may include a plurality of payor/customer profiles 282 and each profile 282 includes payment attributes/criteria 260 associated with the payor. Payee-profile database 290 may include a plurality of payee profiles 292 and each profile 292 includes payment attributes/criteria 260 associated with the payee. The financial institution/bank database 294 may include payment attributes/criteria 270 associated with an input payment request type or any other relevant association.

As previously noted, the payment routing determination sub-module 170 may determine any appropriate payment route 180 type from among more than one alternative. The payment route/type may include check/paper 300, credit/debit card 302, electronic/ACH 304, wire 306, SWIFT 308, merchant 310, account transfer 312 or ant other 314 remittance/settlement payment route/type. An alternative payment route comprises two or more of the payment route-types. For example, check/paper 300 or credit/debit 302 comprises one alternative payment route, SWIFT 308 or account transfer 312 comprises another alternative payment route and wire 306 or SWIFT 308 or merchant 310 comprises another alternative payment route.

FIG. 4 provides a flow diagram of a composite method 400 for payment processing including transformation of the payment request to a standardized format and transformation to a target clearing format, in accordance with an embodiment of the present invention. At Event 410, a payment request is inputted via a designated input channel. FIG. 5 provides a block diagram of various examples of payment input channels 500. It should be noted that the payment input channels 500 shown in FIG. 5 are by of example only and are not intended to be limiting. The payment input channels 500 may include customer (i.e., individual, joint or the like) payment input channels 510 and business/front end payment input channels 530. The customer payment input channels 510 provide for customer-to-business payment inputs and/or customer-to-consumer (i.e., consumer-to-consumer) payment inputs. The business/front end payment input channels 530 provide for business-to-business payment inputs and/or business-to-consumer payment inputs.

The customer payment input channels are user interface's and may include, but are not limited to, Open Financial Exchange (OFX)/Mobile payment input channel 512, generally operable on handheld devices and the like; web-based payment input channel 514, such as the Internet or a corporate website that is generally operable to receive Automated Clearing House (ACH) requests, wire payment requests, bill payment and the like; telephone/Interactive Voice Response (IVR) payment input channel 516; banking center payment input channel (in person) 518; and Automated Teller Machine (ATM) payment input channel 520.

The business/front end input channels 530 include, but are not limited to, point-of-sale payment input channel 532, such as credit/debit card swipe or the like; image exchange payment input channel 534; remote deposit payment input channel 536; bulk file messaging payment input channel 538; and straight back office integration input channel 540, in which a business application directly calls/accesses a financial institution payment engine to originate a transaction.

Referring again to the method 400 of FIG. 4, at Event 420, payment arrangement attributes/criteria are established. The payment arrangement attributes/criteria are configurable data that is associated with a consumer payor/payee or a corporate payor/payee and is subsequently used by the payment processing hub to process various aspects of the payment request. FIG. 6 provides a block diagram of various examples of payment arrangement criteria/attribute sources 600. The sources 600 may include, but are not limited to, payee profile/set-up 610. Payee profile/set-up 610 may be a dynamic set-up for a specific payment that the payee is to receive. For example, the payee receives notification that a payment is forthcoming and through an appropriate designated channel, such as a website or the like, the payee configures payment attributes/criteria, such as the time requirements for the payment or the like. Alternatively, the payee may have a predetermined payment profile, which may be stored in an accessible payee profile database that predefines payment attributes/criteria.

The payment arrangement criteria/attribute sources 600 may additionally include invoicing and payment statements 620 issued by the payor and/or payee that define payment arrangement attributes/criteria for a specific payment or a series of payments, such as payment risk/quality, payment destination and the like. Sources 600 may additionally include payment alerts and/or payment notifications 630 that are generally associated with a specific payment or a series of payments and define payment arrangement criteria specifically designated by the payor, the payee or the financial institution handing the payment transaction.

The payment arrangement criteria/attribute sources 600 may include payor profile/set-up 640. Payor profile/set-up 640 may be a dynamic set-up for a specific payment that the payor has requested. Alternatively, the payor may have a predetermined payment profile, which may be stored in an accessible payor profile database that predefines payment attributes/criteria.

Referring again to the method 400 of FIG. 4, at Event 430, the payment request is transformed, otherwise referred to as normalized, to a standard format to allow for processing of all different payments regardless of input channels. As previously noted, according to specific embodiments, the standardized format may be in accordance with ISO 20022 Universal Financial Industry Message Scheme format. In conventional, known payment processing each payment input channel requires a dedicated silo for processing the payment. In accordance with present embodiments, transformation to a standard format allows for comprehensive payment processing to occur generically regardless of the type of payment input channel.

At Event 440, payment processing occurs at what is referred to herein as a payment hub. Based on the transformation/normalization of the payment request, the payment hub is capable of processing all types of payment input requests. It should be noted that while the events (Events 442, 444 and 446) shown in payment processing block occur in sequential order, according to present embodiments, the events may occur in any order, as determined by the payment hub, in order to optimize the payment process.

It should be noted that the routines, modules, applications and functions shown in relation to Event 440 and described herein as occurring in the payment engine may be accessed and implemented by other applications, such as other payment processing applications that do not implement the payment engine or the like. In this regard, other applications may access the specific routines, modules, applications and functions on an as-needed basis. For example, if another payment processing application requires payment validation in the form of compliance to anti-money laundering laws, the application can access and implement that specific portion of the payment hub as opposed to implementing the multiple applications in the payment hub or the payment hub in its entirety.

Payment processing may include, at Event 442, receiving the payment instructions, such as payment attributes/criteria, invoicing/statements, alerts, notifications and the like, which are used to make payment processing decisions. At Event 446, specific payment processing occurs within one or sub-modules based on the payment type being made. FIG. 7 is a block diagram detailing various exemplary specific payment process sub-module 700 that may be implemented at the payment hub, in accordance with embodiments of the present invention. It should be noted that the specific payment process sub-modules 700 highlighted in FIG. 7 are by way of example only and are not intended to be limiting. In addition, the ordering of the payment processing may be determined at the payment hub, in some embodiments on a per-payment basis, to increase the overall efficiency and effectiveness of the payment processing model.

Specific payment process sub-modules 700 may include scheduled and recurring payment sub-module 710. The scheduled and recurring payment sub-module 710 manages the initiation of future dated and recurring payments, including the use of predefined custom templates set-up for the scheduled/recurring payments. Additionally, specific payment process sub-modules 700 may include debit/credit correlation sub-module 720 that includes timing and sequencing processing to insure the relationship of the original payment association. In this regard, individual credits are associated and balanced to original debit when processed at a payment item level.

The specific payment process sub-modules 700 may also include verification sub-module 730 operable to verify the payment and associated account attributes to insure positive clearing of the payment. Additionally, specific payment process sub-modules 700 may include bulk payment sub-module 740 that is operable to aggregate and optimize communications to external systems for large payment files having multiple individual payment items with multiple payment items having the same posting accounts. Also, specific payment process sub-module 700 may include payment warehouse/database 750 that is operable to store future dated payments, payment history, recurring payment models and the like.

Referring again to the method 400 of FIG. 4, payment processing (Event 440) may also include validation processing 446 of the payment. FIG. 8 is a block diagram detailing various exemplary validation process sub-modules 800 that may be implemented at the payment hub, in accordance with embodiments of the present invention. It should be noted that the specific validation process sub-modules 800 highlighted in FIG. 8 are by way of example only and are not intended to be limiting. In addition, the ordering of the validation processing may be determined at the payment hub, in some embodiments on a per-payment basis, to increase the overall efficiency and effectiveness of the payment processing model.

Validation process sub-modules 800 may include compliance process sub-module 810 operable to insure anti-money laundering of the payment. Compliance processing may include a security check of Office of Foreign Asset Control (OFAC) listing of known individuals, corporations or the like associated with illegal payment processing. Additionally, validation process sub-modules 800 may include foreign exchange/Single European Payments Area (SEPA) sub-module 820 operable to maximize foreign currency exchange rates, provide for multi-currency support and insure compliance with SEPA rules and regulations.

In addition, validation process sub-modules 800 may include financial risk assessment sub-module 830 operable to provide credit and risk management for the overall payment process. In this regard, the financial risk assessment process may provide for liability risk assessment scores and the like that are subsequently used by the rules-based routing determination to limit or mandate the type of remittance/settlement route that may be implemented. For example, if the financial risk is determined to be high, route determination may exclude wire payments as a remittance/settlement payment option.

Also, validation process sub-modules 800 may include exception handling sub-module 840 operable to provide centralized exception processing and management of all payment types. Exception processing takes into account errors in the payment processing, such as formatting error or the like and may implement an auto repair for common exceptions/errors. Auto repair of exceptions provides for less need for manual intervention and improves straight-through payment processing rates.

Referring again to the method 400 of FIG. 4, payment processing (Event 440) may also include rules-based route determination processing 448. FIG. 9 provides a block diagram of exemplary routing rules 900 that may be implemented in a payment route determination process, in accordance with an embodiment of the present invention. The routing rules illustrated are by way of example only. It should be noted that for any one route determination process one or more of the routing rules may be applied. Priority given to one or more of the rules may be based on payor profile data, payee profile data, notifications, alerts, financial institution rules, and the like. The routing rules 900 may be related to payment routing factors such as, but not limited to, price/cost of processing payment, time requirements for processing the payment, the quality/risk requirements or allowances for processing the payment (i.e., the guarantee of remittance and settlement, the ability to stop payment and the like), the destination of the payment and the like. Thus, the routing rules 900 may include one or more time-related rules 910, cost/price-related routing rules 920, one or more risk/quality-related routing rules 930, one or more destination-related routing rules 940 or other payor/payee defined routing rules 950.

As previously noted, time-related routing rules 910 may define which remittance/settlement type 180 is chosen based on the payor's, payee's and/or the financial institution's acceptable time for completing the payment transaction. In most instances, the payor and/or payee has a desire to complete the payment as timely as possible, while the financial institution handling the payment has a desire to delay the remittance/settlement for as long a time period as possible. Cost/price-related routing rules 920 may define which remittance/settlement type 180 is chosen based on the price that the payor and/or payee is willing to bear for the payment or the cost that the financial institution is willing to bear or likely to charge the payor for handling the payment.

Risk/quality-related routing rules 930 may define which remittance/settlement type 180 is chosen based on the ability to insure or guarantee that the payment will be made, in other words, the service level afforded to the payment or the number of acceptable failure opportunities associated with different payment remittance/settlement types. Other risk/quality routing rules 166 may define the ability to return or stop payment during the payment process, data reconciliation capabilities, such as how funds are balanced, or any other routing rule associated with a quality or risk attribute as defined by the payor, the payee and/or the financial institution handling the payment process. Destination-related routing rules 940 may define which remittance/settlement type 180 is chosen based the destination of the payment. For example, domestic payment may dictate certain types of remittance/settlement, while international payment may dictate other types of remittance/settlement.

Payor/payee-defined rules 950 may additionally define other criteria for choosing the remittance/settlement type. Payor/payee-defined routing rules 950 may be dynamically defined proximate to the time of the payment request or may be predefined in the payor or payee profile. In most instances, payor or payee-defined routing rules will override any other routing rules.

Referring once again to the method 400 of FIG. 4, payment processing may include other processing (not shown in FIG. 4) such as remittance reporting, Business Process Management (BPM) orchestration, transaction tracking/visibility and the like. Remittance reporting provides electronic reporting of the remittance to associated services; examples of remittance reporting include, but are not limited to, Demand Deposit Account (DDA) statements, account reconciliation reporting, balance and transaction reporting and the like. BPM orchestration is operable to determine the order in which processes are taken up in the payment hub, determine and manage the delivery of information to the payment warehouse and the like. The order in which processes are taken up may be determined based on payment input channel, payment attributes/criteria or the determined payment route. Thus, BPM orchestration provides a set of tools for efficiently aligning payment processing. Transaction/tracking visibility allows the payor, payee or any other individual or corporate entity with designated access to view where the payment currently resides in the overall process payment flow. Transaction/tracking visibility is typically implemented through an online user interface, such as a web-based interface or the like.

At Event 450, in accordance with present embodiments, the normalized and processed payment is transformed to the remittance/settlement target clearing format. Transformation to the target clearing format is dictated by the initial normalization of the payment request to a standardized format. In addition, transformation to the target clearing format provides for payment remittance via the payment channel determined at payment route determination processing.

At Event 460, payment is remitted and settled according to the determined payment route. FIG. 10 provides a block diagram of exemplary remittance/settlement payment channels 1000, in accordance with embodiment of the present invention. The remittance payment channels 1000 may include, but are not limited to, check payment 1010, Automated Clearing House (i.e., electronic) payment 1020, wire payment 1030, Society for Worldwide International Financial Telecommunication (SWIFT) payment 1040, debit/credit card payment 1050, merchant payment 1060, and account transfer payment 1070 and settlement channels may include collections 1070 or the like. Additionally, other remittance/settlement payment channel options 1090 may be implemented, such as to take into account future known settlement and remittance options.

Referring to FIG. 11 a flow diagram is illustrated of a method 1100 for financial payment processing including format standardization, in accordance with embodiment of the present invention. At Event 1110, a financial payment transaction request is received from a payor. The payor may input the financial transaction request using any known or future known payment input channel. Examples of payment input channels include, but are not limited to, Open Financial Exchange (OFX)/mobile, web-based, Interactive Voice Response (IVR)/telephone, banking center, Automated Teller Machine (ATM), debit/credit card, merchant, check, image, wire, Automated Clearing House (ACH) or the like.

At Event 1120, the financial transaction request is transformed to a normalized or standard format, such as International Organization for Standardization (ISO) 20022 Universal Financial Industry Message Scheme format or the like. According to present embodiments, financial transaction requests initiated from any known or future known input channel may be normalized/standardized to allow for further generic processing of the payment transaction request. In this regard, standardized formatting of the financial payment transaction request provides for payment processing absent the conventional silo-type processing that mandates that the payment input channel be the same as the payment remittance channel.

At Event 1130, processing of the payment request occurs in the standardized format. In one embodiment, processing occurs in a payment hub that provides for numerous payment processes to occur based on payment type. For example, payment processing may include, but is not limited to, payment route determination processing, scheduled and/or reoccurring payment processing, debit and credit correlation processing, payment verification processing, bulk payment processing, payment compliance processing, foreign exchange processing, financial risk assessment processing, and/or payment exception handling processing.

At Event 1140, the payment transaction is re-formatted to a target clearing format or otherwise transformed to a format associated with the determined payment route. At Event 1150, the financial payment is provided to the payee via the determined payment route.

Thus, methods, devices, systems and computer program products are described herein that provide for optimizing routing of financial payments by determining routing on a per-payment transaction basis based on one or more routing rules. The routing rules take into account payment factors such as, but not limited to, cost of payment processing, time for payment processing, risk/quality of payment processing and/or the destination of the payment. From the payor or payee perspective, payor-defined or payee-defined payment attributes associated with these or other payment factors can be predefined in a payor/payee profile or dynamically defined proximate to the time at which the payment request is initiated. In this regard, present embodiments serve to create a payment process that is beneficial, in terms of cost, timeliness, quality and the like, to both the payor, the payee and financial institution handling payment processing.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for processing financial payments, the method comprising:

receiving, via a computing device, a plurality of financial payment requests originating from a plurality of different payment channels, each payment channel being associated with a respective initial format and wherein the payment channels include consumer payment channels and business payment channels;

transforming, via a computing device processor, the initial format of the plurality of financial payment requests into a standardized format irrespective of the payment channel;

processing, via a computing device processor, the plurality of financial payment requests in the standardized format, wherein processing includes determining payment routing, including a clearing format, for each payment request based on applying payor-defined attributes, payee-defined attributes and financial institution-defined attributes to a plurality of routing rules, wherein the payment rules include a cost-related routing rule, a time-related routing rule, a risk-related routing rule and a payment destination routing rule and wherein the routing rules are configured to determine a least-cost payment type that meets time requirements and risk requirements as defined by the payee-defined attributes, the payor-defined attributes and the financial institution-defined attributes;

transforming, via a computing device processor, the processed payment requests to the determined clearing format; and communicating, via a computing device, the transformed processed payment request to a designated payment remittance channel for payment.

2. The method of claim 1, wherein processing the plurality of financial payment requests further comprises managing, via a computing device processor, initiation of future dated and recurring payments.

3. The method of claim 1, wherein processing the plurality of financial payment requests further comprises correlating, via a computing device processor, credits and debits.

4. The method of claim 1, wherein processing the plurality of financial payment requests further comprises validating, via a computing device processor, the payment and associated payment account attributes.

5. The method of claim 1, wherein processing the plurality of financial payment requests further comprises processing, via a computing device processor, one or more bulk financial payment requests.

6. The method of claim 1, wherein processing the plurality of financial payment requests further comprises storing, in computing device memory, at least one of future dated payments, payment history or recurring payments.

7. The method of claim 1, wherein processing the plurality of financial payment requests further comprises ensuring, via a computing device processor, payment compliance to one or more of a regulatory requirement, an anti-money laundering requirement or an Office of Foreign Assets Control (OFAC) requirement.

8. The method of claim 1, wherein processing the plurality of financial payment requests further comprises providing, via a computing device processor, foreign exchange processing based on currency type.

9. The method of claim 1, wherein processing the plurality of financial payment requests further comprises providing, via a computing device processor, a financial risk assessment.

10. The method of claim 1, wherein processing the plurality of financial payment requests further comprises providing, via a computing device processor, financial payment exception handling processing.

11. The method of claim 1, wherein processing the plurality of financial payment requests further comprises performing, via a computing device processor, a plurality of payment processing processes based on applicability to the payment request, wherein the payment processing processes include managing initiation of future dated and recurring payments, correlating credits and debits, validating the payment and associated payment account attributes, processing one of bulk financial payment requests, storing at least one of future dated payments, payment history or recurring payments, ensuring payment compliance, providing foreign exchange processing, providing a financial risk assessment and providing financial payment exception handling processing.

12. The method of claim 1, wherein receiving a plurality of financial payment requests further comprises receiving, via a computing device, the plurality of financial payment requests originating from the plurality of different payment channels, wherein the consumer payment channels include Open Financial Exchange (OFX), Personal Financial Management (PFM), Interactive Voice Response (IVR), Automated Teller Machine (ATM) and banking center.

13. The method of claim 1, wherein receiving a plurality of financial payment requests further comprises receiving, via a computing device, the plurality of financial payment requests originating from the plurality of different payment channels, wherein the business payment channels include point-of-sale, image exchange, remote deposit and bulk-file messaging.

14. The method of claim 1, wherein communicating further comprises communicating, via the computing device, the transformed processed payment request to a designated payment remittance channel, wherein the payment remittance channel remits payment in a designated payment type, wherein-the payment type includes one of check payment, Automated Clearing House (ACH) payment, wire payment, card payment, merchant payment, account transfer payment, a Society for Worldwide International Financial Telecommunication (SWIFT) payment.

15. An apparatus for processing financial payments, the apparatus comprising:

a computing platform including at least one processor and a memory;

a transformation module stored in the memory, executable by the processor and operable to receive a plurality of financial payment requests originating from a plurality of consumer payment channels and business payment channels, and transform each of the payment requests from an initial format associated with a payment channel to a standardized format; and a payment processing module stored in the memory, executable by the processor and operable to process the plurality of financial payment requests in the standardized format, wherein the payment processing module includes a payment routine sub-module configured to determine payment routing, including a clearing format, for each payment request based on applying payor-defined attributes, payee-defined attributes and financial institution-defined attributes to a plurality of routing rules, wherein the payment rules include a cost-related routing rule, a time-related routing rule, a risk-related routing rule and a payment destination routing rule and wherein the routing rules are configured to determine a least-cost payment type that meets time requirements and risk requirements as defined by the payee-defined attributes, the payor-defined attributes and the financial institution-defined attributes, wherein the transformation module is further operable to transform the processed payment requests to the determined clearing format prior to providing payment for each of the payment requests.

16. The apparatus of claim 15, wherein the payment processing module further comprises a future payment management sub-module operable to manage payment initiation of future dated and recurring payments.

17. The apparatus of claim 15, wherein the payment processing module further comprises a credit and debit correlation sub-module operable to correlate credits and debits.

18. The apparatus of claim 15, wherein the payment processing module further comprises a validation sub-module operable to validate payment requests and associated payment account attributes.

19. The apparatus of claim 15, wherein the payment processing module further comprises a bulk payment sub-module operable to process bulk financial payment requests.

20. The apparatus of claim 15, wherein the payment processing module further comprises a payment database operable to store at least one of future dated payments, payment history or recurring payments.

21. The apparatus of claim 15, wherein the payment processing module further comprises a compliance sub-module operable to ensure payment compliance to one or more of a regulatory requirement, an anti-money laundering requirement or an Office of Foreign Assets Control (OFAC) requirement.

22. The apparatus of claim 15, wherein the payment processing module further comprises a foreign exchange sub-module operable to provide foreign exchange processing based on currency type.

23. The apparatus of claim 15, wherein the payment processing module further comprises a financial risk assessment sub-module operable to assess financial risk of the payment.

24. The apparatus of claim 15, wherein the payment processing module further comprises an exception handling sub-module operable to process financial payment request exceptions.

25. The apparatus of claim 15, wherein the payment processing module further comprises a future payment management sub-module, a debit and credit sub-module, a validation sub-module, a bulk payment sub-module, a payment database, a compliance sub-module, a foreign exchange sub-module, a financial risk assessment sub-module, and an exception handling sub-module.

26. The apparatus of claim 15, wherein the transformation module is further operable to receive the plurality of financial payment requests originating from the plurality of different payment channels, wherein the consumer payment channels include Open Financial Exchange (OFX), Personal Financial Management (PFM), Interactive Voice Response (IVR), Automated Teller Machine (ATM) and banking center.

27. The apparatus of claim 15, wherein the transformation module is further operable to receive the plurality of financial payment requests originating from the plurality of different payment channels, wherein the business payment channels include point-of-sale, image exchange, remote deposit and bulk-file messaging.

28. A computer program product, comprising:
a non-transitory computer-readable medium comprising:
a first set of codes for causing a computer to receive a plurality of financial payment requests originating from a plurality of different payment channels, each payment channel being associated with a respective initial format and wherein the payment channels include consumer payment channels and business payment channels;
a second set of codes for causing a computer to transform the initial format of the plurality of financial payment requests into a standardized format irrespective of the payment channel; and
a third set of codes for causing a computer to process the plurality of financial payment requests in the standardized format, wherein processing includes determining payment routing, including a clearing format, for each payment request based on applying payor-defined attributes, payee-defined attributes and financial institution-defined attributes to a plurality of routing rules, wherein the payment rules include a cost-related routing rule, a time-related routing rule, a risk-related routing rule and a payment destination routing rule and wherein the routing rules are configured to determine a least-cost payment type that meets time requirements and risk requirements as defined by the payee-defined attributes, the payor-defined attributes and the financial institution-defined attributes;
a fourth set of codes for causing a computer to transform the processed payment requests to the determined clearing format; and
a fifth set of codes for causing a computer to communicate the transformed processed payment requests to a designated payment remittance channel for payment.

29. The computer program product of claim 28, wherein the third set of codes is further operable to cause the computer to manage initiation of future dated and recurring payments.

30. The computer program product of claim 28, wherein the third set of codes is further operable to cause the computer to correlate credits and debits.

31. The computer program product of claim 28, wherein the third set of codes is further operable to cause the computer to validate the payment and associated payment account attributes.

32. The computer program product of claim 28, wherein the third set of codes is further operable to cause the computer to ensure payment compliance to one or more of a regulatory requirement, an anti-money laundering requirement or an Office of Foreign Assets Control (OFAC) requirement.

33. The computer program product of claim 28, wherein the third set of codes is further operable to cause the computer to provide foreign exchange processing based on currency type.

34. The computer program product of claim 28, wherein the third set of codes is further operable to cause the computer to provide a financial risk assessment.

35. The computer program product of claim 28, wherein the third set of codes is further operable to cause the computer to provide financial payment exception handling processing.

36. The computer program product of claim 28, wherein the third set of codes is further operable to cause the computer to perform a plurality of payment processing processes based on applicability to the payment request, wherein the payment processing processes include managing initiation of future dated and recurring payments, correlating credits and debits, validating the payment and associated payment account attributes, processing one or more bulk financial payment requests, storing at least one of future dated payments, payment history or recurring payments, ensuring payment compliance, providing foreign exchange processing, providing a financial risk assessment and providing financial payment exception handling processing.

37. The computer program product of claim 28, wherein the first set of codes is further operable to cause the computer to receive the plurality of financial payment requests originating from the plurality of different payment channels, wherein the consumer payment channels include Open Financial Exchange (OFX), Personal Financial Management (PFM), Interactive Voice Response (IVR), Automated Teller Machine (ATM) and banking center.

38. The computer program product of claim 28, wherein the third set of codes is further operable to cause the computer to receive the plurality of financial payment requests originating from the plurality of different payment channels, wherein the business payment channels include point-of-sale, image exchange, remote deposit and bulk-file messaging.

* * * * *